Patented Oct. 3, 1944

2,359,537

UNITED STATES PATENT OFFICE 2,359,537

PROCESS FOR THE EXTRACTION OF ACONITIC ACID FROM PLANT JUICES

Emil K. Ventre, Baton Rouge, Joseph A. Ambler and Sam Byall, New Orleans, and Herbert C. Henry, Baton Rouge, La., assignors to the United States of America as represented by Claude R. Wickard, Secretary of Agriculture, and his successors in office No Drawing. Application August 10, 1943, Serial No. 498,080

7 Claims. (Cl. 260—527)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for the extraction of aconitic acid from certain plant juices containing sugar, particularly sorgo juice, and is an improvement in the process disclosed in United States Patent No. 2,280,085, granted to Ventre et al.

The objects of the invention are to extract a larger quantity of aconitic acid than is extracted by the process of the above-mentioned patent, to extract the aconitic acid in a manner that does not have adverse effects on subsequent separation of the sucrose from the juices, and such other objects as will be apparent from the following description and claims.

In general, according to the process of Patent No. 2,280,085, the aconitic acid is separated from the raw, cold sorgo juice by addition of calcium hydroxide to give a pH of from 8.4 to 8.6, and after removal of the starch in the manner therein disclosed, the remaining 30 degrees Baumé syrup is heated to its boiling temperature and settled for from 6 to 10 hours, after which the sediment, which consists largely of the calcium salt of the aconitic acid, is removed.

Further studies of the above process have shown that the maximum removal of aconitic acid is about 48 percent of that present in sorgo juice, the removed salt being principally the tri-calcium salt of said acid.

Attempts to secure higher extractions by increasing the amount of calcium hydroxide have resulted in such high alkalinities that when the syrup is heated to precipitate the aconitate salts, the monosaccharides decompose with attendant adverse effects on the subsequent separation of sucrose. Furthermore, it was found that the aconitate salts precipitated from these high alkaline syrups were different in character from those precipitated from slightly acid syrups, being more soluble in the syrups, not forming definite crystals, and being soluble in both hot and cold water, making removal and washing of the salts to free them of the syrup extremely difficult.

Determinations of the free aconitic acid as compared to the total aconitates contained in sorgo juices indicate that the acid exists partly as free acid and partly as combined acid, the free acid content accounting for only about one-fourth of the total. Neutralization of the free acid with calcium hydroxide does not provide sufficient calcium to precipitate the combined acid, and increasing the amount of calcium hydroxide results in the afore-mentioned undesirable high alkalinity.

We have found, however, that it is possible to supply the needed calcium to precipitate the combined acid as calcium aconitate by the addition of a calcium salt which is soluble in the plant juices, and that the precipitation is efficiently effected if accurate control of the pH of the juices is maintained. Therefore, calcium hydroxide should be used along with the calcium salt in quantity sufficient to neutralize the free acids and give a pH of about from 6.7 to 6.9, but not higher than 7.0, in the syrup after the evaporation and heat treatments. If the pH is greater than 7.0, the aconitate formed is amorphous, water soluble, and it scales the heating surfaces during evaporation. Adjustment of the pH to about from 8.3 to 8.4 in the syrup before it is evaporated results in the proper pH control of the evaporated syrup.

The aconitates separated from sorgo juices, although principally the calcium salt, have been found to contain a small amount of magnesium aconitate, about 2 percent of magnesium being present in those separated according to the process of the above-mentioned patent. Therefore, in selecting a calcium salt for the process of this invention, it is preferable to select one, such as calcium chloride, whose corresponding magnesium salt is also soluble in the syrups. This renders it easier in subsequent processes to produce and separate the aconitic acid from the aconitates, since then the chloride, or corresponding ions when other calcium salts are used, will combine with the magnesium and the magnesium salt will remain in the solution, and the freed calcium ions will form calcium aconitate with the free aconitate radicals and be precipitated, thereby substantially eliminating the magnesium from the separated aconitates. Calcium chloride is desirable from this standpoint, and is also preferred because of its low cost.

The quantity of the calcium salt employed need not be closely controlled, although at least a sufficient amount should be present to supply the calcium requirement to precipitate the combined aconitic acid present in the syrup as the tricalcium salt, a slight excess not being objectionable if not sufficient to interfere with subsequent utilization of the syrup.

A specific application of the invention is exhibited in the following example:

Raw, cold sorgo juice, obtained by either milling or diffusion and centrifuged for removal of starch, is treated with calcium hydroxide to neutralize the free acid and produce a pH of about from 8.3 to 8.4 in the cold juice. Calcium chloride, in an amount slightly in excess of that calculated to combine with the combined aconitic acid present, determined by correcting for the free aconitic acid as compared to the total aconitates, is then added. This juice is then heated to about from 100° to 110° C., its boiling temperature, and is allowed to settle. The clear juice is removed and evaporated under vacuum, with enzyme treatment to convert the residual starch, to a concentration of 32° Bé. The resulting syrup is heated to its boiling temperature in an open vessel, whereupon the aconitates precipitate and the syrup has a pH of about 6.85. The aconitates may then be separated from the liquid either by decanting, filtering or centrifuging.

Analysis of the juices in different stages of the process in the above example shows an increase in purity of about from 72 in the raw, cold juice, to 78 in the defecated syrup. Th defecated syrup shows a drop of carbonate ash from 6.98 to 5.46 percent due to the removal of the aconitates, based on Brix solids, and a purity increase in the syrup of about from 75 to 78. The aconitic acid was reduced from 3.12 percent in the raw juice to 0.575 percent in the defecated syrup, based on the total solids contained in the juice. The yield of aconitic acid according to the process of this invention was found to be about from 80 percent to 85 percent of the total present in the juice. Sucrose was crystallized from the syrup, after removal of the aconitates according to the above-described process, to give a final molasses of 28 purity.

Having thus described the invention, what is claimed is:

1. A process for the extraction of aconitic acid from plant juices containing free aconitic acid, combined aconitic acid and sugar, comprising treating the juices with a calcium salt which is soluble in the juices and with calcium hydroxide, in such proportions that the calcium hydroxide neutralizes the free aconitic acid and produces a pH of about from 8.3 to 8.4, the calcium salt reacting with the combined aconitic acid to form calcium aconitate, concentrating the juices, and heating to precipitate calcium aconitate.

2. A process for the extraction of aconitic acid from plant juices containing free aconitic acid, combined aconitic acid and sugar, comprising treating the juices with a calcium salt which is soluble in the juices and which reacts with the combined aconitic acid to form calcium aconitate and with calcium hydroxide, concentrating the juices to a density of about 32° Bé., and heating to precipitate calcium aconitate, the proportions being such that the calcium hydroxide neutralizes the free aconitic acid and gives a pH of about from 6.7 to 7.0 in the syrup after the concentration and heating.

3. The process of claim 1, characterized in that the amount of calcium salt is at least that sufficient to supply the calcium requirements to precipitate the combined aconitic acid present in the syrup as calcium aconitate.

4. The process of claim 1, characterized in that the calcium salt is one whose corresponding magnesium salt is soluble in the juices.

5. The process of claim 1, characterized in that the calcium salt is calcium chloride.

6. The process of claim 1, characterized in that the treatment of the juices with the calcium salt and the calcium hydroxide comprises, first, mixing the calcium hydroxide into the juices, and then adding the calcium salt.

7. In a process for the extraction of aconitic acid from liquids containing free aconitic acid and combined aconitic acid, forming calcium aconitate by the combined action of calcium hydroxide and a calcium salt which is soluble in the liquid and reacts with the combined aconitic acid to form calcium aconitate.

EMIL K. VENTRE.
JOSEPH A. AMBLER.
SAM BYALL.
HERBERT C. HENRY.